US009579860B2

(12) United States Patent
Inoue et al.

(10) Patent No.: US 9,579,860 B2
(45) Date of Patent: Feb. 28, 2017

(54) MANUFACTURING METHOD OF PNEUMATIC TIRE

(71) Applicant: TOYO TIRE & RUBBER CO., LTD., Osaka-shi, Osaka (JP)

(72) Inventors: Yuji Inoue, Osaka (JP); Syuuichi Nishikawa, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 698 days.

(21) Appl. No.: 13/659,258

(22) Filed: Oct. 24, 2012

(65) Prior Publication Data

US 2013/0133811 A1 May 30, 2013

Related U.S. Application Data

(60) Provisional application No. 61/679,857, filed on Aug. 6, 2012.

(30) Foreign Application Priority Data

Nov. 25, 2011 (JP) ................................. 2011-257626

(51) Int. Cl.
*B29D 30/60* (2006.01)
*B29D 30/08* (2006.01)
(Continued)

(52) U.S. Cl.
CPC ............... *B29D 30/08* (2013.01); *B29D 30/60* (2013.01); *B29D 2030/526* (2013.01); *B60C 19/082* (2013.04); *B60C 2011/0091* (2013.04)

(58) Field of Classification Search
CPC ... B29D 30/60; B29D 2030/526; B60C 19/08; B60C 19/082; B60C 2011/0091
(Continued)

(56) References Cited

U.S. PATENT DOCUMENTS

2009/0173419 A1* 7/2009 Kawakami ................. 152/152.1
2009/0188608 A1* 7/2009 Matsuoka et al. ............ 156/117
(Continued)

FOREIGN PATENT DOCUMENTS

JP          2009-126291 A        6/2009

OTHER PUBLICATIONS

German Office Action dated Sep. 16, 2015, issued in counterpart German patent application No. 112012004900.4 with English translation. (9 pages).

*Primary Examiner* — Geoffrey L Knable
(74) *Attorney, Agent, or Firm* — Westerman, Hattori, Daniels & Adrian, LLP (57) ABSTRACT

A manufacturing method of a pneumatic tire comprises a forming step of a tread rubber which includes a two-shot stage of simultaneously winding a first rubber ribbon constructed by a nonconductive rubber, and a second rubber ribbon constructed by a nonconductive rubber. In the two-shot stage, the first rubber ribbon and the second rubber ribbon which are adjacent to each other are spirally wound in such a manner as to come into contact with each other, and a ribbon winding position passes through an L-shaped route. A conductive rubber is partly provided in the first rubber ribbon in the winding process when the ribbon winding position passes through the L-shaped route. A conductive portion which spirally and continuously extends to the tread end from the ground-contacting surface and intermittently appears in the tire meridian cross section is formed by the conductive rubber.

5 Claims, 10 Drawing Sheets (51) Int. Cl.
*B60C 19/08* (2006.01)
*B29D 30/52* (2006.01)

(58) Field of Classification Search
USPC ............ 156/117, 397, 130; 152/209.5, 152.1
See application file for complete search history.

(56) References Cited

U.S. PATENT DOCUMENTS

2010/0006194 A1* 1/2010 Asayama et al. .......... 152/152.1
2010/0258227 A1   10/2010 Kuroki
2011/0303332 A1* 12/2011 Kawakami ................. 152/209.5

* cited by examiner

MANUFACTURING METHOD OF PNEUMATIC TIRE

BACKGROUND OF THE INVENTION

Field of the Invention

The present invention relates to a manufacturing method of the pneumatic tire which can discharge a static electricity generated in a vehicle body and a tire to a road surface.

Description of the Related Art

Recently, there have been proposed a pneumatic tire including a tread rubber blended with silica at a high ratio in order to reduce the rolling resistance that largely affects the fuel consumption of a vehicle and to increase braking performance (WET braking performance) on a wet road surface. However, compared to a tread rubber blended with carbon black at a high ratio, the electric resistance of such tread rubber is high, and accordingly, static electricity generated on a vehicle body or the tire is prevented from being released to the road surface. As a result, problems like radio noises tend to occur.

Accordingly, there has been developed a pneumatic tire which can achieve electrical conduction performance by forming a conductive portion made of a conductive rubber blended with carbon black or the like, in a tread rubber made of a nonconductive rubber blended with silica or the like. For example, in a pneumatic tire described in Patent Document 1, a tread rubber which is formed by a nonconductive rubber is provided with a conductive portion in which one end is exposed to a ground-contacting surface and the other end is connected to a side wall rubber or a topping rubber of a carcass.

However, in the tread rubber which is provided in the pneumatic tire mentioned above, since a conductive portion which is continuously provided in a tire circumferential direction and is formed as an L-shaped cross section is expanded like a uniform sheet, and a much volume of conductive rubber is included, it has been known that an improvement of a performance can be expected by reducing it. In addition, in practice, it is important to enhance a forming efficiency of the tread rubber so as to improve a productivity.

PRIOR ART DOCUMENTS

Patent Document 1: Japanese Unexamined Patent Publication No. 2009-126291

SUMMARY OF THE INVENTION

The present invention is made by taking the circumstance mentioned above into consideration, and an object of the present invention is to provide a manufacturing method of a pneumatic tire which can reduce a conductive rubber included in a tread rubber as well as enhancing a forming efficiency of the tread rubber.

The object can be achieved by the following present invention. That is, the present invention provides a manufacturing method of a pneumatic tire comprising a forming step of a tread rubber, wherein the forming step of the tread rubber includes a two-shot stage of simultaneously winding a first rubber ribbon which is supplied from a first rubber ribbon forming apparatus and is constructed by a nonconductive rubber, and a second rubber ribbon which is supplied from a second rubber ribbon forming apparatus and is constructed by a nonconductive rubber, in the two-shot stage, the first rubber ribbon and the second rubber ribbon which are adjacent to each other are spirally wound in such a manner as to come into contact with each other, and a ribbon winding position passes through an L-shaped route which extends to an inner side in a tire diametrical direction from a ground-contacting surface and extends to one side in a tire width direction so as to reach a tread end, in a tire meridian cross section, and a conductive rubber is partly provided in the first rubber ribbon in the winding process at a time when the ribbon winding position passes through the L-shaped route, and a conductive portion which spirally and continuously extends to the tread end from the ground-contacting surface and intermittently appears in the tire meridian cross section is formed by the conductive rubber.

In the pneumatic tire which is manufactured by the present invention, the conductive portion provided in the tread rubber spirally and continuously extends to the tread end from the ground-contacting surface, and intermittently appears in the tire meridian cross section. Accordingly, in comparison with the structure in which the conductive portion expanded like the uniform sheet, it is possible to reduce the conductive rubber which is included in the tread rubber. Further, since the forming step of the tread rubber includes the two-shot stage as mentioned above, it is possible to shorten a time which is required for winding the rubber ribbon, and it is possible to enhance the forming efficiency of the tread rubber.

In the present invention, it is preferable that the tread rubber has a cap portion which constructs the ground-contacting surface, and a base portion which is provided in the inner side in the tire diametrical direction of the cap portion, the cap portion is formed by the two-shot stage, and the conductive portion spirally and continuously extending extends to the inner side in the tire diametrical direction from the ground-contacting surface so as to reach an outer peripheral surface of the base portion, and extends to one side in the tire width direction between the cap portion and the base portion so as to reach the tread end.

Accordingly, it is possible to simply form the conductive portion as mentioned above at a time of forming the cap portion in the forming step of the tread rubber. Further, since the cap portion is formed by the two-shot stage, it is possible to effectively enhance the forming efficiency of the tread rubber.

In the present invention, it is preferable that in the two-shot stage, the ribbon winding position moves from a start point which is positioned closer to a center side than a tread end to the other side in the tire width direction, in the tire meridian cross section, is next turned to the one side in the tire width direction at the tread end in the other side, next passes through the L-shaped route while getting across the start point, is next turned to the other side at the tread end in the one side, and reaches an end point which is positioned closer to the center side than the tread end.

In accordance with this, since it is possible to form the tread rubber (or the cap portion of the tread rubber) by the one time winding of the first and second rubber ribbons, without cutting the rubber ribbon in the winding process, the forming efficiency of the tread rubber is improved. Further, when the winding positions of the first and second rubber ribbons pass through the L-shaped route, it is possible to form the conductive portion as mentioned above.

As a preferred aspect of the present invention, there is a method in which the conductive rubber is partly provided in the second rubber ribbon in the winding process at a forming position of a main groove which extends in a tire circumferential direction, and the conductive rubber of the second rubber ribbon is connected to the conductive rubber of the first rubber ribbon, at a time when the ribbon winding position passes through the L-shaped route. In accordance with this, it is possible to stably achieve an electrical conduction performance by locally increasing the conductive rubber which is arranged in the inner side in the tire diametrical direction of the main groove, and preventing a disconnection of the conductive portion going with the formation of the main groove.

As a preferred aspect of the present invention, there is a method in which a winding pitch of the first rubber ribbon is made smaller at a forming position of a main groove which extends in a tire circumferential direction, at a time when the ribbon winding position passes through the L-shaped route. In accordance with this, it is possible to stably achieve an electrical conduction performance by locally increasing the conductive rubber which is arranged in the inner side in the tire diametrical direction of the main groove, and preventing a disconnection of the conductive portion going with the formation of the main groove.

As a preferred aspect of the present invention, there is a method in which a cross sectional area of the conductive rubber of the first rubber ribbon in the winding process is enlarged at a forming position of a main groove which extends in a tire circumferential direction, at a time when the ribbon winding position passes through the L-shaped route. In accordance with this, it is possible to stably achieve an electrical conduction performance by locally increasing the conductive rubber which is arranged in the inner side in the tire diametrical direction of the main groove, and preventing a disconnection of the conductive portion going with the formation of the main groove.

BRIEF DESCRIPTION OF THE DRAWINGS

FIGS. 6(A) and 6(B) are cross sectional views of a first rubber ribbon;

FIGS. 9(A) to 9(E) are cross sectional views schematically showing a forming step of the tread rubber;

DETAILED DESCRIPTION OF THE PREFERRED EMBODIMENTS

An embodiment of the present invention will be explained with reference to the drawings. First of all, a description will be given of a structure of a pneumatic tire which is manufactured by the present invention, and a description will be next given of a manufacturing method of the pneumatic tire in accordance with the present invention.
Structure of Pneumatic Tire A pneumatic tire T shown in FIG. 1 includes a pair of bead portions 1, side wall portions 2 extending from the bead portions 1 to outer side in a tire diametrical direction, and a tread portion 3 connected to outer ends in a tire diametrical direction of the side wall portions 2. The bead portion 1 includes an annular bead core 1a composed of a bundle of steel wires or the like sheathed with rubber and a bead filler 1b made of hard rubber.

Figure 1:
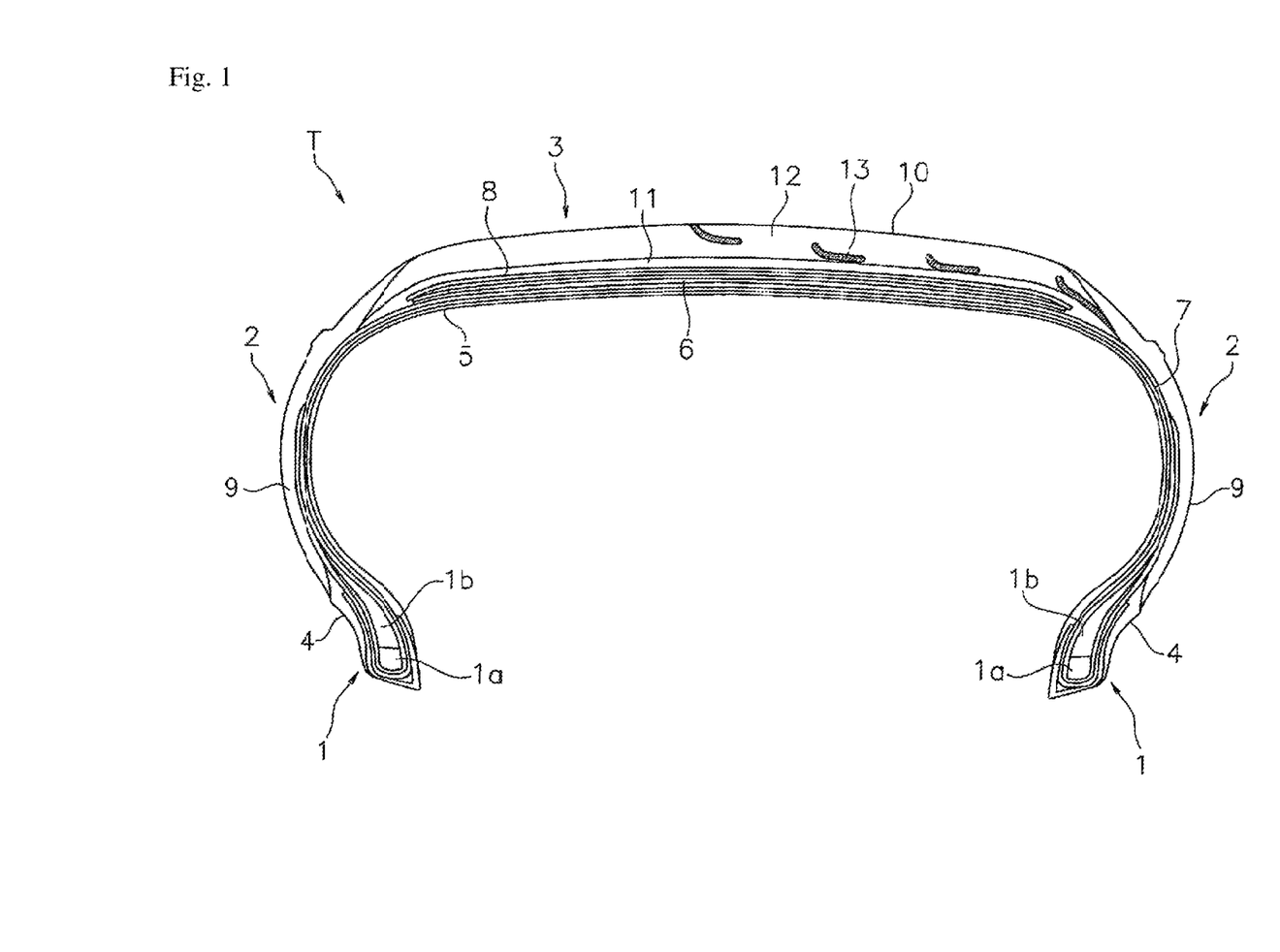
FIG. 1 is a tire meridian cross sectional view showing an example of a pneumatic tire which is manufactured by the present invention.

A toroidal carcass layer 7 is arranged between the pair of bead portions 1, and an end portion thereof is locked in a state of being wound up via the bead core 1a. The carcass layer 7 is constructed by at least one (two in the present embodiment) carcass ply, and the carcass ply is formed by coating a cord which extends at an angle of approximately 90 degree with respect to a tire circumferential direction by a topping rubber. An inner liner rubber 5 for retaining a pneumatic pressure is arranged in an inner periphery of the carcass layer 7.

In the bead portion 1, a rim strip rubber 4 which comes into contact with a rim (not shown) at a time of being installed to the rim is provided in an outer side of the carcass layer 7. Further, in the side wall portion 2, a side wall rubber 9 is provided in an outer side of the carcass layer 7. In the present embodiment, the rim strip rubber 4 and the side wall rubber 9 are formed by conductive rubber respectively.

In the tread portion 3, a belt layer 6 which is constructed by a plurality of (two in the present embodiment) belt plies is arranged in an outer side of the carcass layer 7. Each of the belt plies is formed by coating a cord extending while inclining with respect to the tire circumferential direction with a topping rubber, and is laminated in such a manner that the cord intersects inversely to each other between the plies. A belt reinforcing layer 8 which is formed by coating a cord extending substantially in the tire circumferential direction by a topping rubber is arranged in an outer periphery of the belt layer 6, however, it may be omitted as occasion demands.

In the tread portion 3, a tread rubber 10 is provided in an outer periphery of the belt layer 6. The tread rubber 10 has a cap portion 12 which constructs a ground-contacting surface, and a base portion 11 which is provided in an inner side in a tire diametrical direction of the cap portion 12, and they are both formed by a nonconductive rubber. The base portion 11 is made of a different kind of rubber from the cap portion 12.

Further, the tread rubber 10 is provided with a conductive portion 13 which reaches a tread end from the ground-contacting surface. The conductive portion 13 spirally and continuously extends along the tire circumferential direction from one end which is exposed to the ground-contacting surface to the other end which reaches the tread end, and the other end is connected to the side wall rubber 9. The conductive portion 13 is formed by a conductive rubber. All of the tread rubber 10 is formed by the nonconductive rubber except the conductive portion 13. In order to achieve an easy discrimination on the drawings, the conductive portion (the conductive rubber) is colored by dark in FIG. 1 and the like.

The conductive rubber is a rubber in which a volume resistivity is less than $10^8$ Ω·cm, and is exemplified by a structure in which a carbon black is blended as a reinforcing agent at a high rate in a raw material rubber. The carbon black is blended, for example, at 50 weight part or more with respect to 100 weight part of a rubber component. The conductive rubber can be obtained by blending a known conductivity applying material such as a carbon including a carbon fiber, a graphite and the like, or a metal including a metal powder, a metal oxide, a metal flake, a metal fiber and the like other than the carbon black.

The nonconductive rubber is a rubber in which the volume resistivity is equal to or more than $10^8$ Ω·cm, and is exemplified by a structure in which a silica is blended as a reinforcing agent at a high rate in the raw material rubber. The silica is blended, for example, at 30 weight part or more with respect to 100 weight part of the rubber component. As the silica, a wet type silica can be preferably employed, however, any material which is generally used as a reinforcing material can be used without limitation. The nonconductive rubber maybe produced by blending a calcined clay, a hard clay, a calcium carbonate or the like in addition to the silica such as a precipitated silica, a silicic anhydride or the like.

As for the raw material rubber mentioned above, the following are exemplified; i.e., natural rubber, styrene-butadiene rubber (SBR), butadiene rubber (BR), isoprene rubber (IR), butyl rubber (IIR) and the like. These materials may be used alone or in combination. The above raw rubber is appropriately blended with a curing agent, a cure accelerator, a plasticizer, an antioxidant and the like.

Figure 2:
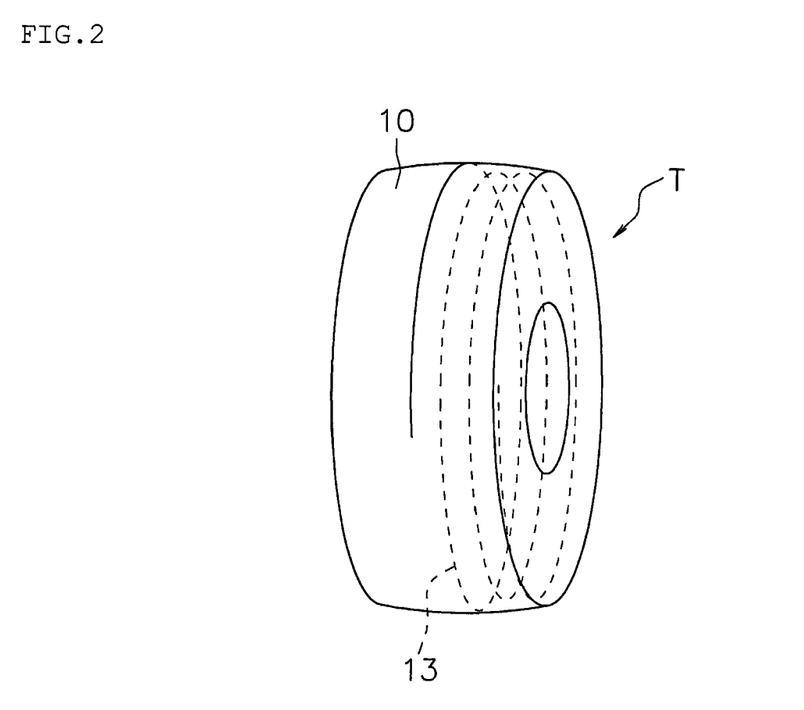
FIG. 2 is a perspective view schematically showing a structure of a conductive portion.
Figure 3:
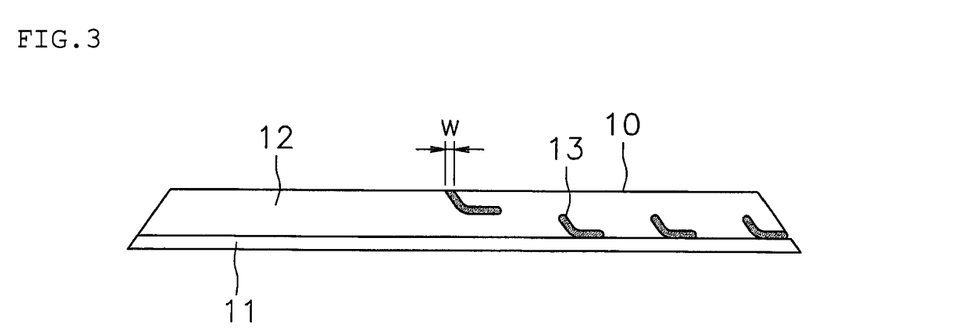
FIG. 3 is a cross sectional view schematically showing the tread rubber before a cure forming.

The conductive portion 13 spirally and continuously extends to the tread end from the ground-contacting surface as shown in FIG. 2, and intermittently appears in a tire meridian cross section as shown in FIG. 3. The conductive portion 13 spirally extends toward an inner side in a tire diametrical direction from the ground-contacting surface so as to reach an outer peripheral surface of the base portion 11, and spirally extends toward one side (a right side in FIGS. 1 to 3) in a tire width direction on the outer peripheral surface of the base portion 11 therefrom so as to reach the tread end. In the conductive portion 13 in accordance with the present embodiment, one end which is exposed to the ground-contacting surface, and the other end which reaches the tread end appear in the same tire meridian cross section, however, the structure is not limited to this.

The tire T is provided with a conductive route which reaches the ground-contacting surface from the rim (not shown) via the rim strip rubber 4, the side wall rubber 9 and the conductive portion 13. A static electricity generated in a vehicle body or a tire is discharged to a road surface through the conductive route. Therefore, in the present embodiment, it is possible to form a topping rubber of each of the carcass layer 7, the belt layer 6 and the belt reinforcing layer 8 by the nonconductive rubber.

The ground-contacting surface to which the one end of the conductive portion 13 is exposed indicates the surface of the tread portion 3 grounding on the road surface at a time when the tire is put vertically on the flat road surface in a state of being assembled in a normal rim and being filled with a normal internal pressure, and a normal load is applied. The normal rim is a rim which is determined per tire by a standard system including a standard on which the tire is based, for example, is a standard rim in JATMA, "Design Rim" in TRA, or "Measuring Rim" in ETRTO.

The normal internal pressure is a pneumatic pressure determined per tire by a standard system including a standard on which the tire is based, and is a maximum pneumatic pressure in JATMA, a maximum value described in Table "TIRE LOAD LIMITS AT VARIOUS COLD INFLATION PRESSURES" in TRA, or "INFLATION PRESSURE" in ETRTO, however, in the case that the tire is for a passenger car, it is set to 180 kPa. Further, the normal load is a load determined per tire by a standard system including a standard on which the tire is based, and is a maximum load capacity in JATMA, a maximum value described in Table mentioned above in TRA, or "LOAD CAPACITY" in ETRTO, however, in the case that the tire is for a passenger car, it is set to 80% of the maximum load capacity.

A position of the one end of the conductive portion 13 is not particularly limited as long as it is within the ground-contacting surface, however, it is preferable that it is a center portion in the tire width direction for achieving an improvement of a wet braking performance. Further, for the same reason, in the case that a center rib passing through a tire equator is provided on a surface of the tread rubber 10, it is preferable that the conductive portion 13 is exposed on the center rib.

It is preferable that an exposure width w of the conductive portion 13 in the ground-contacting surface is equal to or less than 5 mm for reducing the conductive rubber included in the tread rubber 10. Further, it is preferable that the exposure width w is equal to or more than 1.5 mm for well retaining an electrical conduction performance while preventing a disconnection of the conductive route, and it is more preferable that it is equal to or more than 2.0 mm.

In the present embodiment, there is shown an example in which the conductive portion 13 is connected to the side wall rubber 9, however, the structure is not limited to this, but the conductive portion 13 maybe connected to the carcass layer 7 in which the topping rubber is formed by the conductive rubber. In this case, since there is provided a conductive route which reaches the ground-contacting surface from the rim via the rim strip rubber 4, the topping rubber of the carcass layer 7 and the conductive portion 13, it is possible to form the side wall rubber 9 by the nonconductive rubber. As mentioned above, the conductive portion 13 is connected to a rubber (the topping rubber of the carcass layer 7 and/or the side wall rubber 9) which can be conducted electrically from the rim at a time of being installed to the rim.

In the present embodiment, there is employed a side-on tread structure in which an end portion of the side wall rubber 9 is mounted to an end portion of the tread rubber 10, however, it is possible to employ a tread-on side structure in which the end portion of the tread rubber is mounted to the end portion of the side wall rubber, in place of this. In this case, a wing rubber formed by the conductive rubber may be joined to a side surface of the tread rubber, and the conductive portion may be connected to the wing rubber.

Figure 4:
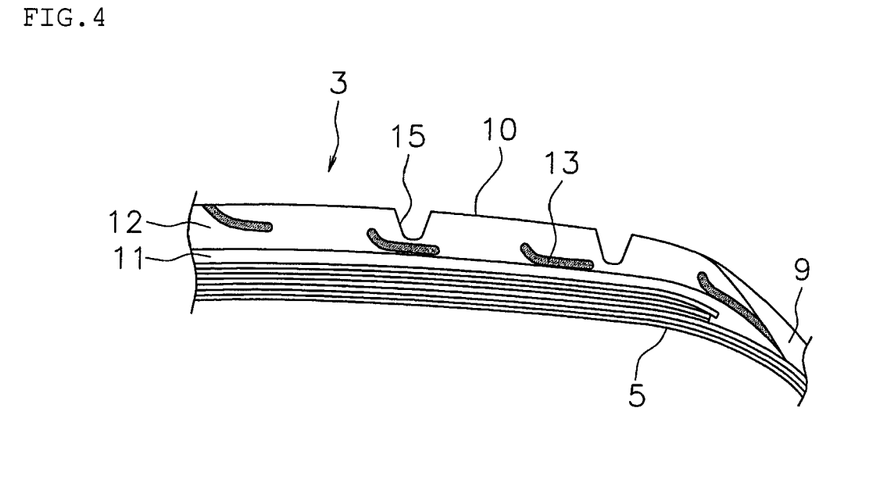
FIG. 4 is a cross sectional view showing a substantial part of the tread rubber after a cure forming.

If a cure treatment is applied to the tire T, main grooves 15 extending in the tire circumferential direction are provided in a surface of the tread rubber 10 as shown in FIG. 4. Projections are provided in a tire mold which is used for the cure treatment, and the main grooves 15 are formed by pressing the projections to the tread rubber 10. Although an illustration is omitted, the tread rubber 10 is appropriately provided with a lateral groove extending in a direction which crosses the main groove 15.

Manufacturing Method of Pneumatic Tire

Next, a description will be given of a method of manufacturing the pneumatic tire T. Since the pneumatic tire T can be manufactured in the same manner as the conventional tire manufacturing step except a point relating to the tread rubber 10, a description will be given mainly of a forming step of the tread rubber.

The tread rubber 10 is formed in accordance with a so-called ribbon winding construction method. The ribbon winding construction method is a construction method of spirally winding an uncured rubber ribbon having a small width along the tire circumferential direction and forming a rubber member having a desired cross sectional shape.

Figure 5:
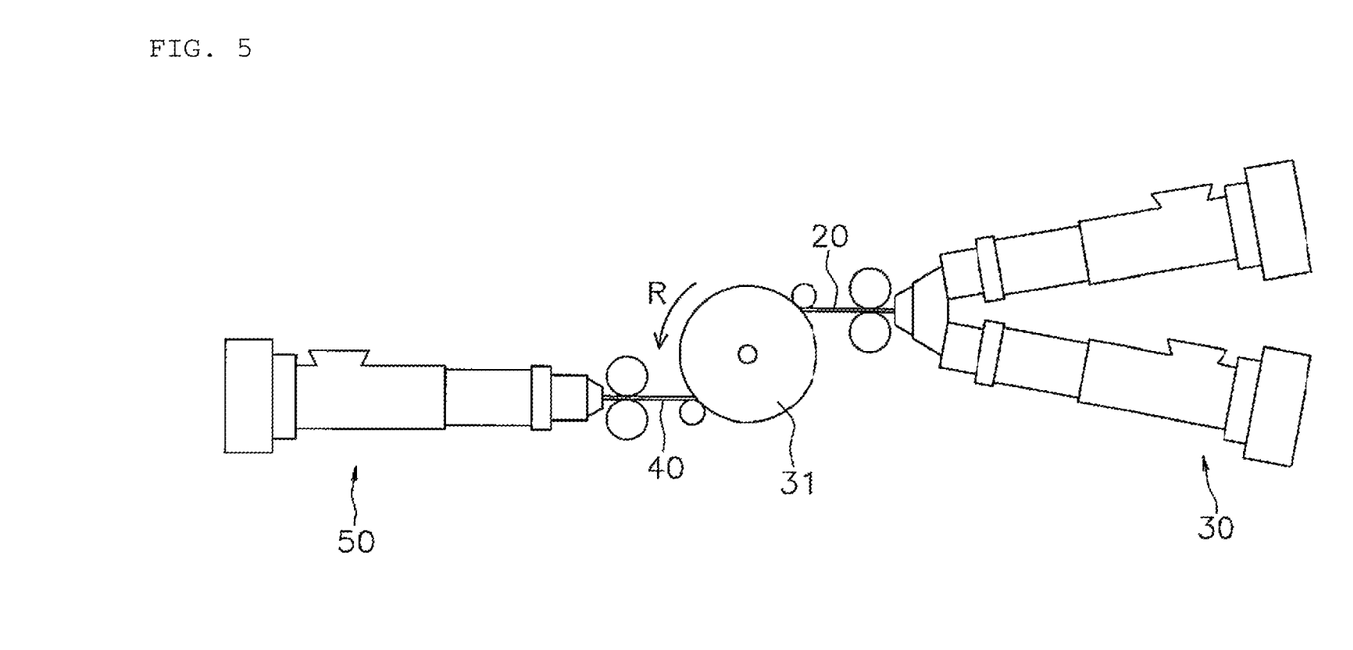
FIG. 5 is a view showing a manufacturing facility which is used in a forming step of the tread rubber.
Figures 6, 7:
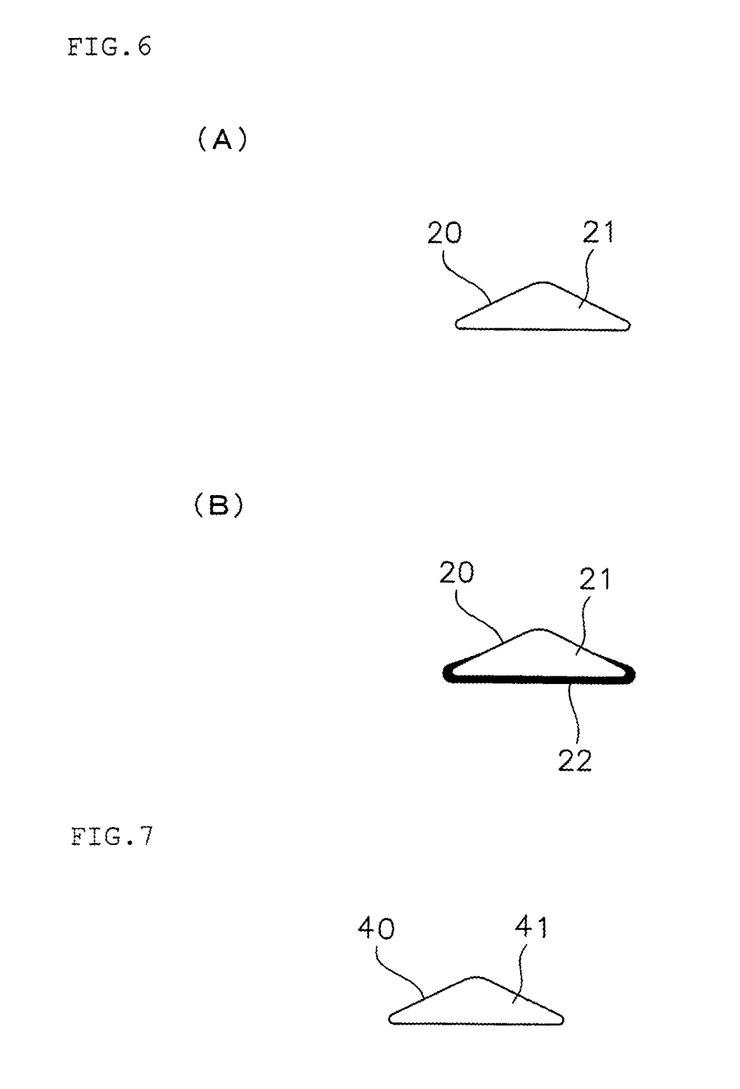
FIG. 7 is across sectional view of a second rubber ribbon.

A forming step of the tread rubber includes a two-shot stage of simultaneously winding a first rubber ribbon 20 which is supplied from a first rubber ribbon forming apparatus 30, and a second rubber ribbon 40 which is supplied from a second rubber ribbon forming apparatus 50, to a rotating support body 31 while rotating the rotating support body 31, as shown in FIG. 5. The rubber ribbons 20 and 40 are respectively formed by nonconductive rubbers 21 and 41 as shown in FIGS. 6 and 7. At a time of winding, a lower side in FIGS. 6 and 7 comes to an inner peripheral side which faces the rotation support body 31.

The rubber ribbon 20 shown in FIG. 6(A) is constructed only by the nonconductive rubber 21, however, may be provided partly with a conductive rubber 22 as shown in FIG. 6(B) as occasion demands. In FIG. 6(B), a cross section of the rubber ribbon 20 is sectioned into a plurality of regions including a region which is constructed by the nonconductive rubber 21, and a region which is constructed by the conductive rubber 22. In the rubber ribbon 20 of the present embodiment, an inner peripheral surface of the nonconductive rubber 21 is coated by the conductive rubber 22.

Figure 8:
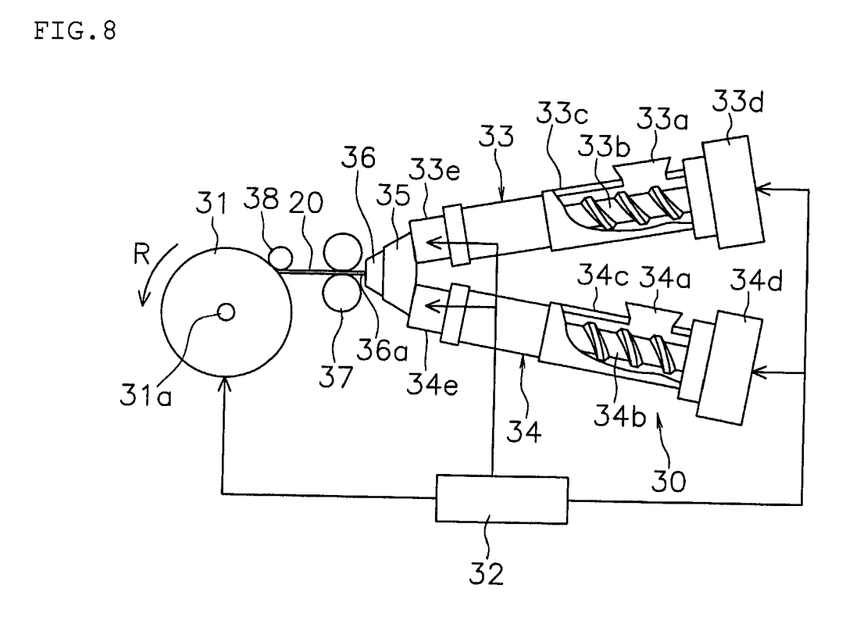
FIG. 8 is a view showing a first rubber ribbon forming apparatus.

As shown in FIG. 8, the rubber ribbon forming apparatus 30 is structured such that it can form the rubber ribbon 20 having double layers by co-extruding two kinds of rubbers. The rotational support body 31 is structured such that it can rotate in a direction R around an axis 31a and move in an axial direction. As mentioned above, to the rotating support body 31, there are simultaneously wound the rubber ribbon 20 which is supplied from the rubber ribbon forming apparatus 30, and the rubber ribbon 40 which is supplied from the rubber ribbon forming apparatus 50 which is not illustrated in FIG. 8. A control apparatus 32 carries out an operation control of the rubber ribbon forming apparatuses 30 and 50 and the rotating support body 31.

An extruding machine 33 is provided with a hopper 33a, a screw 33b, a barrel 33c, a drive apparatus 33d of the screw 33b, and a head portion 33e having a gear pump built-in. In the same manner, an extruding machine 34 is provided with a hopper 34a, a screw 34b, a barrel 34c, a drive apparatus 34d and a head portion 34e. A rubber combining portion 35 additionally provided with a die 36 is provided in leading ends of a pair of extruding machines 33 and 34.

If the nonconductive rubber corresponding to the rubber material is introduced in the hopper 33a, and the conductive rubber corresponding to the rubber material is introduced in the hopper 34a, the respective rubbers are fed out forward while being mixed by the screws 33b and 34b, passed by the head portion 33e and 34e, combined in a predetermined shape at the rubber combining portion 35, and extruded as the double-layered rubber ribbon 20 shown in FIG. 6(B) from a discharge port 36a. The formed rubber ribbon 20 is fed out forward by a roll 37, and is wound around the rotational support body 31 while being pressed by a roller 38.

If the extrusion of the conductive rubber 22 is stopped by inhibiting a rotation of a gear pump within a head portion 34e, and inhibiting a rotation of a screw 34b as occasion demands, at a time of forming the rubber ribbon 20, the rubber ribbon 20 formed as a single layer of the nonconductive rubber 21 can be obtained as shown in FIG. 6(A). The actuation of the gear pump within the head portion 34e and the screw 34b as mentioned above is controlled by the control apparatus 32, and it is possible to freely carry out a switching between the single layer and the double layer of the rubber ribbon 20.

The rubber ribbon forming apparatus 50 is provided with an extruding machine which is the same as mentioned above, and the formed rubber ribbon 40 is wound to the rotating support body 31. The extruding machine which is provided in the rubber ribbon forming apparatus 50 is structured such as to supply the rubber ribbon 40 which is exclusively constructed only by the nonconductive rubber 41, as is different from the dual extruding machine as shown in FIG. 8. In the present embodiment, a cross section of the rubber ribbon 20 and the rubber ribbon 40 is a triangular shape, however, is not limited to this, but may be the other shapes such as an oval shape, a quadrangular shape and the like.

In the forming step of the tread rubber 10, first of all, as shown in FIG. 9(A), the base portion 11 is formed on an outer peripheral surface of the rotating support body 31. Although an illustration is omitted, a belt layer 6 and a belt reinforcing layer 8 are provided previously on an outer peripheral surface of the rotation support body 31, and the base portion 11 is formed on them. The base portion 11 may be formed by any of a so-called extrusion forming method and the ribbon winding construction method (including the two-shot stage). The extrusion forming method is a construction method of extrusion forming an uncured band-like rubber member having a desired cross sectional shape and jointing end portions to each other so as to form an annular shape.

Next, as sequentially shown in FIGS. 9(B) to 9(E), the cap portion 12 is formed on the outer peripheral surface of the base portion 11, whereby the tread rubber 10 shown in FIG. 3 is formed. The cap portion 12 is formed by the two-shot stage, that is, by simultaneously winding the rubber ribbon 20 and the rubber ribbon 40. In detail, as mentioned later, in this two-shot stage, the conductive rubber 22 is partly provided in the rubber ribbon 20 in the winding process, and the conductive portion 13 is formed by the conductive rubber 22.

Figure 10:
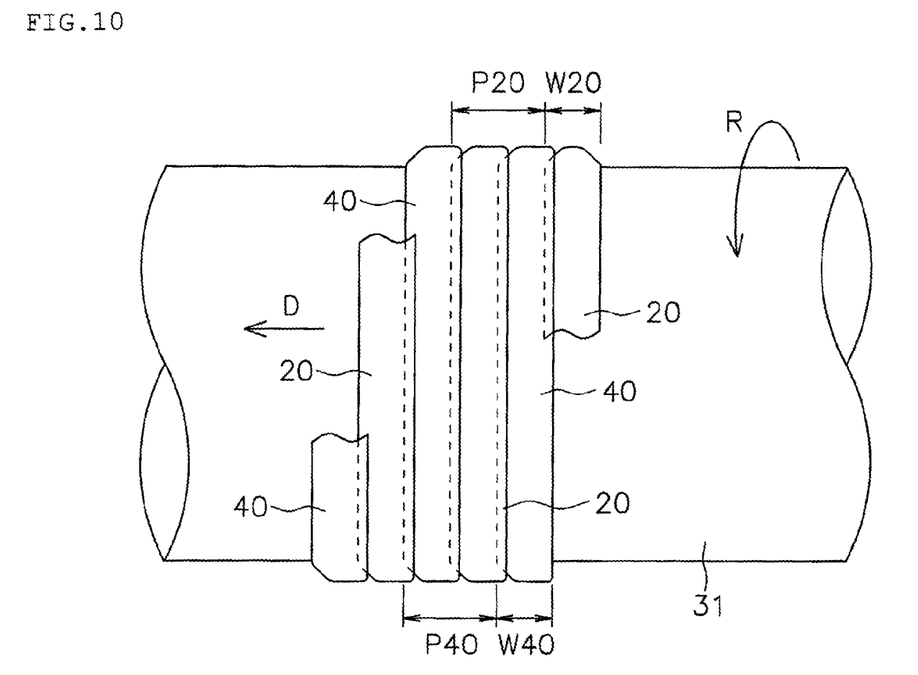
FIG. 10 is a plan view showing a winding process in two shot stage.

In the two-shot stage, as shown in FIG. 10, the rubber ribbon 20 and the rubber ribbon 40 which are adjacent to each other are wound spirally in such a manner as to come into contact with each other. A winding pitch P20 of the rubber ribbon 20 is set to be larger than a ribbon width W20, and the rubber ribbon 40 is spirally wound in such a manner as to be interposed between the rubber ribbons 20. In the same manner, a winding pitch P40 of the rubber ribbon 40 is set to be larger than a ribbon width W40. An arrow D indicates a moving direction of a ribbon winding position, and the adjacent rubber ribbons 20 and 40 superpose their edge portions with each other along this direction.

Figure 9:
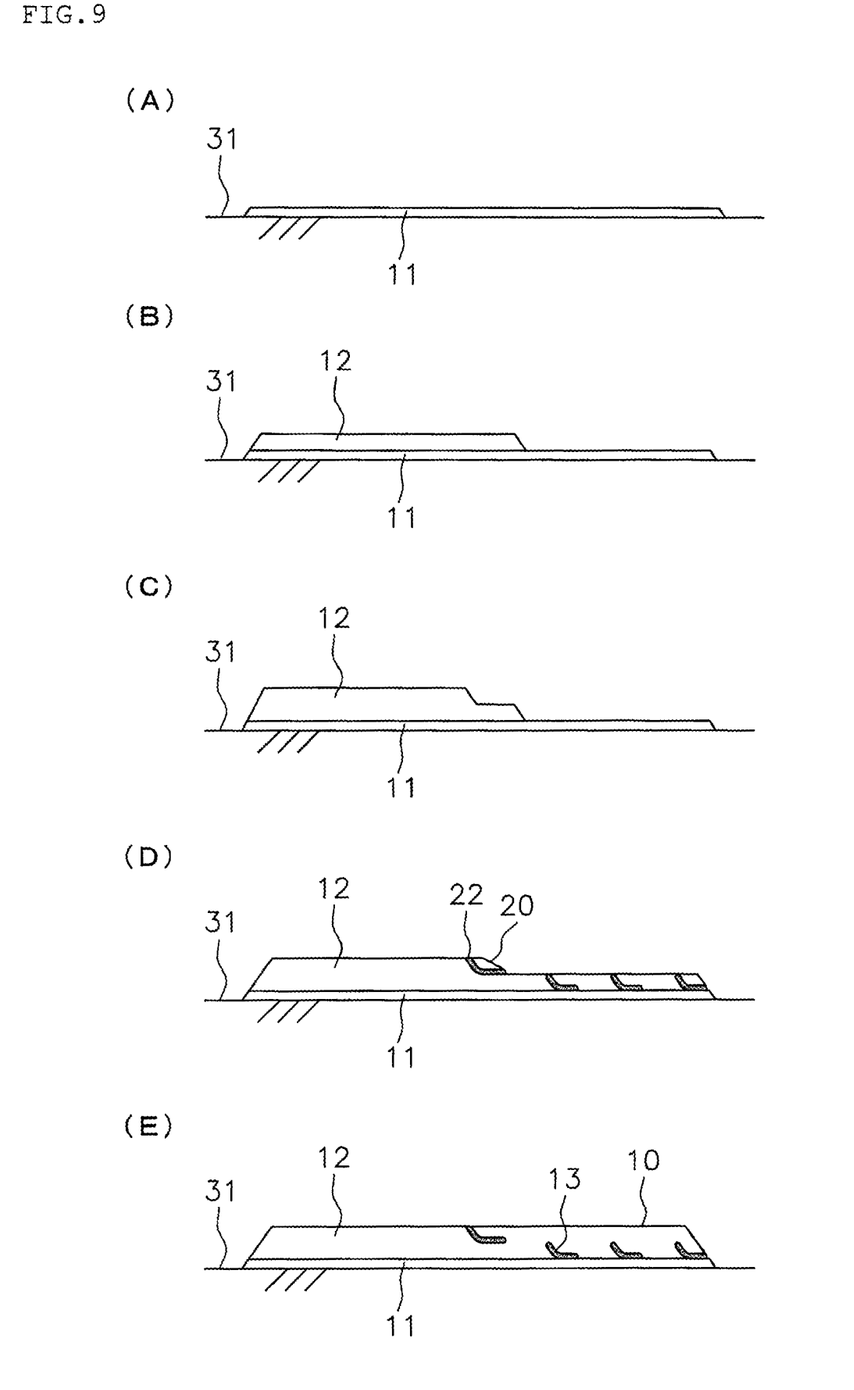
Figure 11:
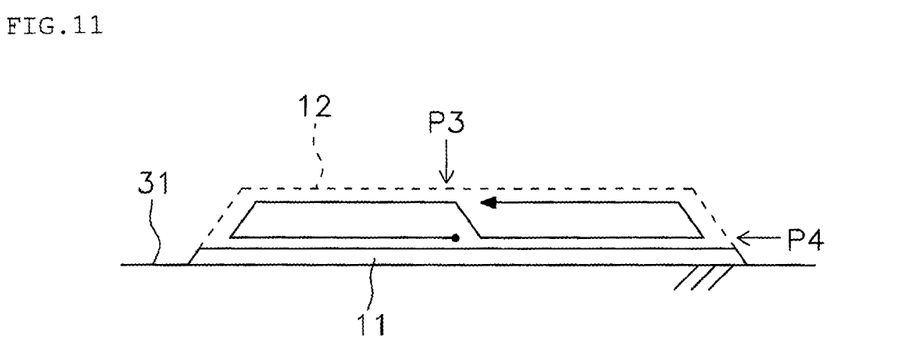
FIG. 11 is a conceptual view showing a moving route of a ribbon winding position.

FIG. 11 conceptually shows a moving route of the winding position of the rubber ribbons 20 and 40 in the forming step of the tread rubber shown in FIG. 9. As mentioned above, in the two-shot stage of the present embodiment, the rubber ribbons 20 and 40 are wound along a lateral figure eight route. At this time, the ribbon winding position extends to an inner side in the tire diametrical direction from the ground-contacting surface, extends to one side in the tire width direction and reaches a tread end so as to pass through an L-shaped route (a route to a tread end P4 from a point P3), in the tire meridian cross section.

Figure 12:
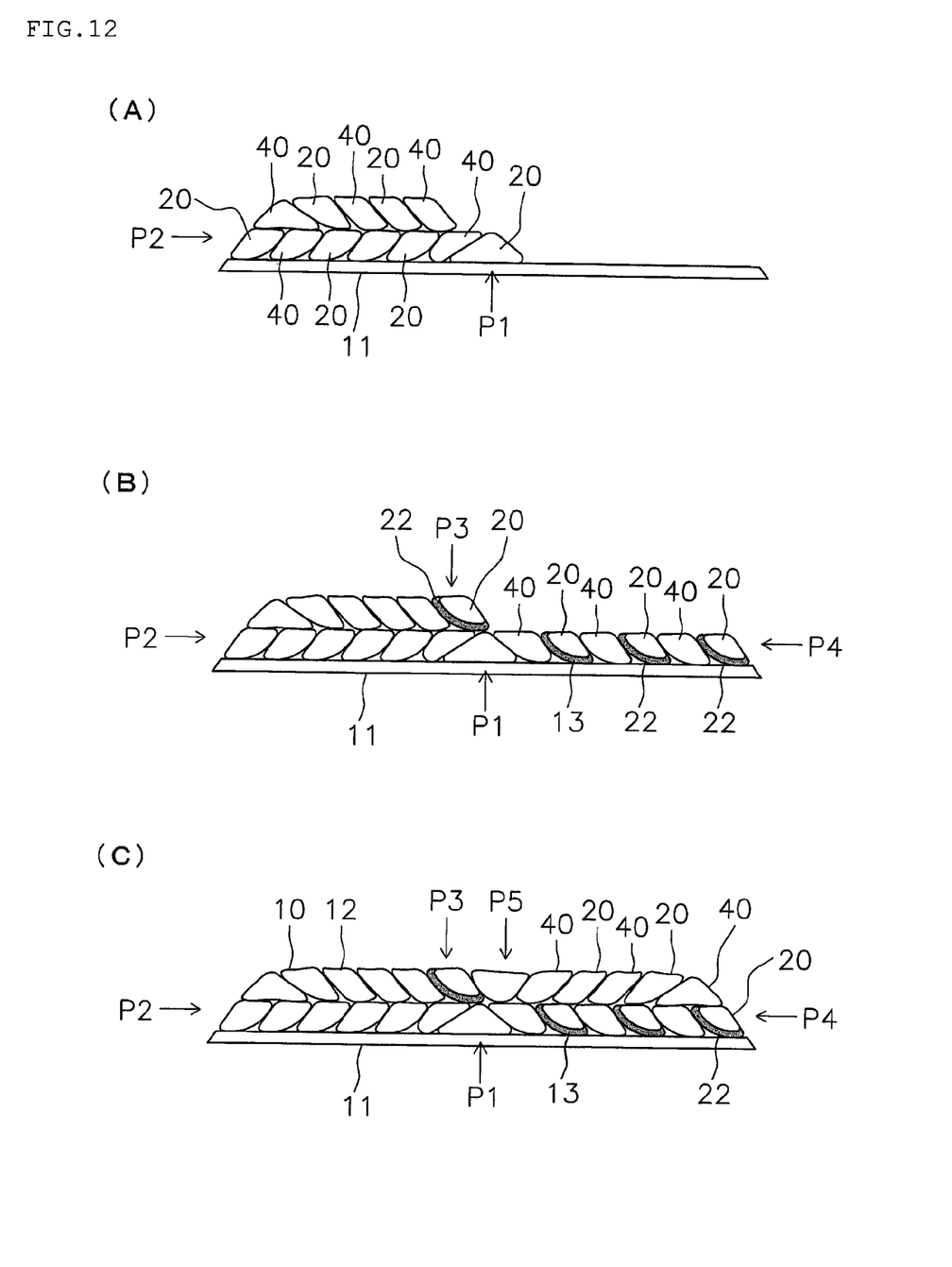
FIG. 12 is a cross sectional view showing a winding process of the rubber ribbon.

Specifically, the rubber ribbons 20 and 40 are wound as sequentially shown in FIGS. 12(A) to 12(C). FIG. 12 is drawn conceptually, and a cross sectional ratio of each of the rubber ribbons 20 and 40 with respect to the tread rubber 10 may be smaller.

FIG. 12(A) corresponds to the stages in FIGS. 9(B) and 9(C), and the ribbon winding position moves from a start point P1 to the other side (a left side in FIG. 12) in the tire width direction, and is next turned to one side in the tire width direction at a tread end P2 in the other side. FIG. 12(B) corresponds to the stage in FIG. 9(D), and the ribbon winding position passes through the L-shaped route while getting across the start point P1, that is, reaches the tread end P4 in one side from the point P3. FIG. 12(C) corresponds to the stage in FIG. 9(E), and the ribbon winding position is turned to the other side at the tread end P4 so as to reach an end point P5.

As shown in FIG. 12(B), when the ribbon winding position passes through the L-shaped route, the conductive rubber 22 is partly provided in the rubber ribbon 20 in the winding process. As a result, the conductive portion 13 which spirally and continuously extends to the tread end P4 from the ground-contacting surface and intermittently appears in the tire meridian cross section is formed by the conductive rubber 22. The conductive rubber 22 of the rubber ribbon 20 which is arranged at the point P3 is exposed to the ground-contacting surface, and the conductive rubber 22 of the rubber ribbon 20 which is arranged at the tread end P4 is exposed to the side surface of the tread rubber 10 so as to be connected to the side wall rubber 9.

In the present embodiment, the start point P1 and the end point P5 are set in the center portion in the tire width direction of the tread rubber 10, however, they are not limited to this, as long as they are positioned closer to the center side than the tread ends P2 and P4, that is, as long as they are not set to the tread ends P2 and P4. Further, as long as the L-shaped route as mentioned above is included, it is possible to employ a moving route which is different from FIG. 11.

The tread rubber 10 formed as mentioned above can effectively reduce the conductive rubber included in the tread rubber 10, in comparison with the structure in which the conductive portion is expanded like the uniform sheet shape. As a result, it is possible to enhance an improving effect obtained by forming the tread rubber 10 by the nonconductive rubber (that is, in the case that the nonconductive rubber is blended with the high silica, an effect of reducing a rolling resistance and an effect of improving a wet braking performance). In addition, since it is possible to enhance the forming efficiency of the tread rubber 10 by simultaneously winding the rubber ribbons 20 and 40, it is useful for improving a productivity.

In the present embodiment, in accordance with the cap portion 12 being formed by the two-shot stage, the conductive portion 13 which spirally and continuously extends to the inner side in the tire diametrical direction from the ground-contacting surface so as to reach the outer peripheral surface of the base portion 11, and extends to one side in the tire width direction between the cap portion 12 and the base portion 11 so as to reach the tread end P4.

Although an illustration is omitted in FIGS. 9 and 12, the belt layer 6 and the belt reinforcing layer 8 are arranged in the inner periphery of the formed tread rubber 10. After the forming step of the tread rubber, the step proceeds to a forming step of a green tire, whereby the pneumatic tire T shown in FIG. 1 is formed by mounting the tread rubber 10 on the outer peripheral surface of the carcass layer 7 which is formed as the toroidal shape, and combining with the other tire constructing members. Thereafter, the step proceeds to a curing step of the tire, and the tread pattern with the main grooves 15 shown in FIG. 4 is formed by applying a curing process to the green tire.

In the curing step of the tire, there is a risk that the conductive portion 13 is disconnected at a time of forming the main groove 15 by pressing the projection to the surface of the tread rubber 10. Accordingly, the conductive rubber arranged in the inner side in the tire diametrical direction of the main groove 15 (refer to FIG. 4, which is not shown in FIGS. 13 to 15) may be locally increased by a countermeasure shown in FIGS. 13 to 15, in such a manner that the electrical conduction performance can be stably achieved. Among these countermeasures, a plurality of them may be used together. Further, there is an advantage that a design of the tread pattern is not constrained by doing away with a fear that the conductive portion 13 is disconnected.

Figure 13:
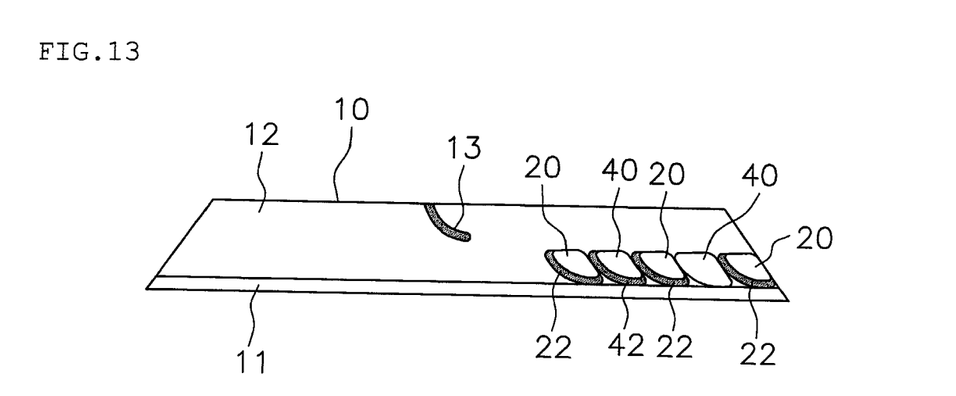
FIG. 13 is a cross sectional view conceptually showing a tread rubber in accordance with the other embodiment of the present invention.

FIG. 13 is an example in which a conductive rubber 42 is partly provided in the rubber ribbon 40 in the winding process at the forming position of the main groove 15, and the conductive rubber 42 of the rubber ribbon 40 is connected to the conductive rubber 22 of the rubber ribbon 20, at a time when the ribbon winding position passes through the L-shaped route. In accordance with this, the conductive rubber which is arranged in the inner side in the tire diametrical direction of the main groove 15 becomes a surface shape, and it is possible to suppress the disconnection of the conductive portion 13. In this case, the dual extruding machine as shown in FIG. 8 is provided in the rubber ribbon forming apparatus which supplies the rubber ribbon 40.

Figure 14:
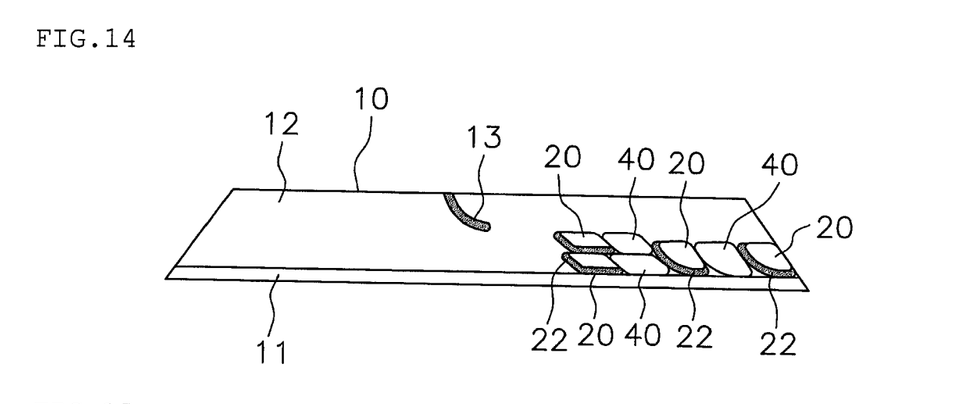
FIG. 14 is a cross sectional view conceptually showing a tread rubber in accordance with the other embodiment of the present invention.

FIG. 14 is an example in which a winding pitch of the rubber ribbon 20 is made smaller at the forming position of the main groove 15, at a time when the ribbon winding position passes through the L-shaped route. In accordance with this, the conductive rubber 22 is densely arranged in the inner side in the tire diametrical direction of the main groove 15, and it is possible to suppress the disconnection of the conductive portion 13. For example, there can be thought a matter that a 180 degree pitch (the winding pitch is equal to the ribbon width at a time of the 180 degree winding) is changed to a 360 degree pitch (the winding pitch is equal to the ribbon width at a time of the 360 degree winding) at the forming position of the main groove 15.

Figure 15:
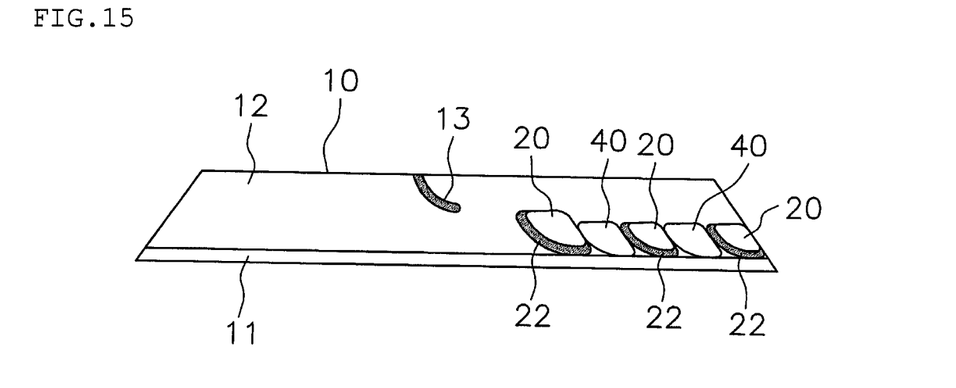
FIG. 15 is a cross sectional view conceptually showing a tread rubber in accordance with the other embodiment of the present invention.

FIG. 15 is an example in which a cross sectional area of the conductive rubber 22 of the rubber ribbon 20 in the winding process is enlarged at the forming position of the main groove 15, at a time when the ribbon winding position passes through the L-shaped route. In accordance with this, it is possible to suppress the disconnection of the conductive portion 13 by increasing the conductive rubber 22 which is arranged in the inner side in the tire diametrical direction of the main groove 15. In this case, across sectional area of a whole of the rubber ribbon 20 may be enlarged by accelerating an extruding speed of the rubber ribbon forming apparatus 30, or a cross sectional area of only the conductive rubber 22 maybe enlarged by adjusting extruding machines 33 and 34.

The present invention is not limited to the embodiment mentioned above, but can be variously modified and changed within the scope of the present invention.

What is claimed is:

1. A manufacturing method of a pneumatic tire, comprising:

a forming step of a tread rubber, wherein the forming step of the tread rubber includes a two-shot stage of simultaneously winding a first rubber ribbon which is supplied from a first rubber ribbon forming apparatus and is constructed by a nonconductive rubber, and a second rubber ribbon which is supplied from a second rubber ribbon forming apparatus and is constructed by a nonconductive rubber, the first rubber ribbon and the second rubber ribbon being wound adjacent to each other, in the two-shot stage, the first rubber ribbon and the second rubber ribbon which are adjacent to each other are spirally wound in such a manner as to come into contact with each other, and, when viewed in a tire meridian cross-section, a ribbon winding position passes through an L-shaped route which extends from a ground-contacting surface to an inner side in a tire diametrical direction, and extends to one side in a tire width direction so as to reach a tread end, a conductive rubber is partly provided only in the first rubber ribbon in the winding process starting at a time when the ribbon winding position passes the ground contacting surface of the L-shaped route and ending at a time when the ribbon winding position reaches the tread end of the L-shaped route, a conductive rubber is not provided in the second rubber ribbon in the winding process such that the second rubber ribbon is exclusively constructed only by the nonconductive rubber, and a conductive portion is formed which spirally and continuously extends from the ground contacting surface to the tread end, and the conductive portion intermittently appears when viewed in the tire meridian cross section and appears only in windings of the first rubber ribbon and does not appear in windings of the second rubber ribbon wound adjacent to the first rubber ribbon.

2. The manufacturing method of the pneumatic tire according to claim 1, wherein the tread rubber has a cap portion which constructs the ground-contacting surface, and a base portion which is provided in the inner side in the tire diametrical direction of the cap portion, the cap portion is formed by the two-shot stage, and the conductive portion spirally and continuously extending extends to the inner side in the tire diametrical direction from the ground-contacting surface so as to reach an outer peripheral surface of the base portion, and extends to one side in the tire width direction between the cap portion and the base portion so as to reach the tread end.

3. The manufacturing method of the pneumatic tire according to claim 1, wherein in the two-shot stage, the ribbon winding position moves from a start point which is positioned closer to a center side than a tread end to the other side in the tire width direction, in the tire meridian cross section, is next turned to the one side in the tire width direction at the tread end in the other side, next passes through the L-shaped route while getting across the start point, is next turned to the other side at the tread end in the one side, and reaches an end point which is positioned closer to the center side than the tread end.

4. The manufacturing method of the pneumatic tire according to claim 1, wherein a winding pitch of the first rubber ribbon is made smaller at a forming position of a main groove which extends in a tire circumferential direction, at a time when the ribbon winding position passes through the L-shaped route.

5. The manufacturing method of the pneumatic tire according to claim 1, wherein a cross sectional area of the conductive rubber of the first rubber ribbon in the winding process is enlarged at a forming position of a main groove which extends in a tire circumferential direction, at a time when the ribbon winding position passes through the L-shaped route.

* * * * *